(12) United States Patent
Ho

(10) Patent No.: US 10,186,941 B2
(45) Date of Patent: Jan. 22, 2019

(54) TORQUE AMPLIFYING MAGNETIC DRIVE

(71) Applicant: Fu-Hung Ho, Taichung (TW)

(72) Inventor: Fu-Hung Ho, Taichung (TW)

( * ) Notice: Subject to any disclaimer, the term of this patent is extended or adjusted under 35 U.S.C. 154(b) by 0 days.

(21) Appl. No.: 15/870,513

(22) Filed: Jan. 12, 2018

(65) Prior Publication Data

US 2018/0226874 A1 Aug. 9, 2018

Related U.S. Application Data

(63) Continuation of application No. 15/428,514, filed on Feb. 9, 2017.

(51) Int. Cl.
*H02K 49/10* (2006.01)
*H02K 51/00* (2006.01)

(52) U.S. Cl.
CPC .......... *H02K 49/102* (2013.01); *H02K 51/00* (2013.01)

(58) Field of Classification Search
CPC .. H02K 49/102; H02K 49/104; H02K 49/106; H02K 49/108; H02K 51/00
USPC .................................... 310/74, 153
See application file for complete search history.

(56) References Cited

U.S. PATENT DOCUMENTS

| 4,128,020 A | 12/1978 | Gray |
| 4,260,901 A * | 4/1981 | Woodbridge ....... F03B 13/1855 290/42 |
| 2006/0243072 A1 | 11/2006 | Ozdamar |
| 2012/0222505 A1 | 9/2012 | Almansor et al. |

FOREIGN PATENT DOCUMENTS

| EP | 1125353 | 10/2004 |
| JP | 2004-353693 | 12/2004 |
| WO | WO 90/10337 | 9/1990 |

OTHER PUBLICATIONS

International Search Report and Written Opinion for International Application No. PCT/US2018/017372 dated May 25, 2018.

* cited by examiner

*Primary Examiner* — Naishadh Desai
(74) *Attorney, Agent, or Firm* — Knobbe, Martens, Olson & Bear, LLP

(57) ABSTRACT

A magnetic drive can be configured to transfer torque from a reciprocating magnet to a flywheel having magnets in a contactless manner. The drive can include a reciprocating magnetic leg assembly which guides a magnet through a reciprocating path. The reciprocating path can be elliptical. The leg assembly can be mounted near the outer surface of a flywheel so as to, way of magnetic attraction forces, transfer torque from the leg assembly to a flywheel.

19 Claims, 10 Drawing Sheets

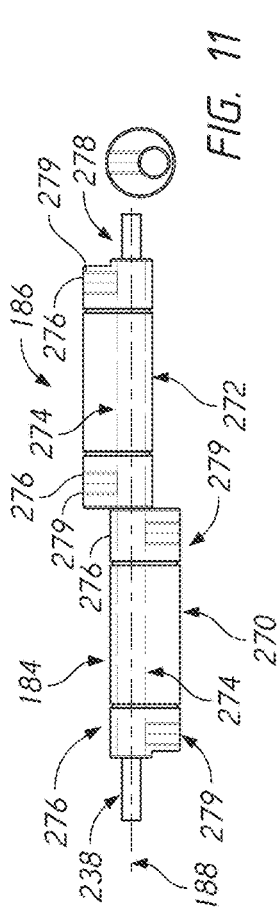
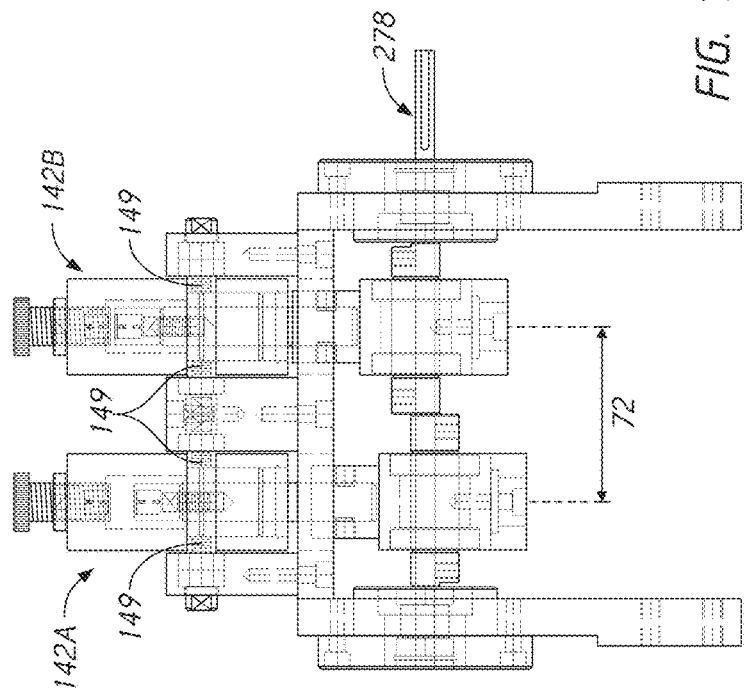
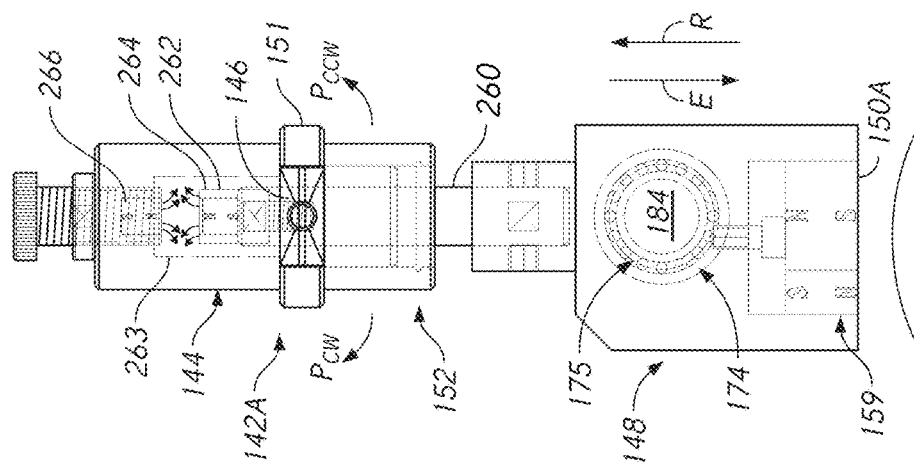
FIG. 11
FIG. 10
FIG. 9

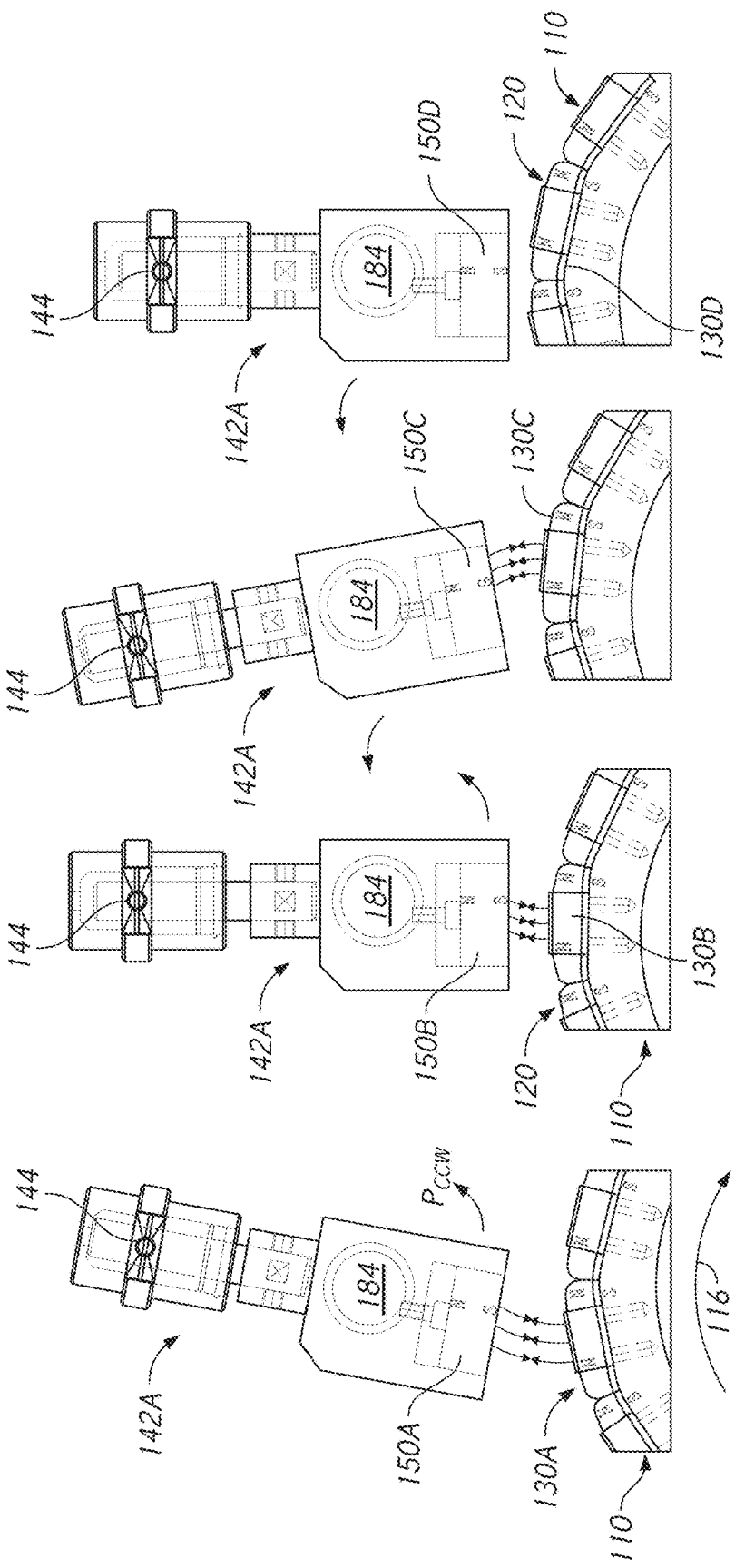

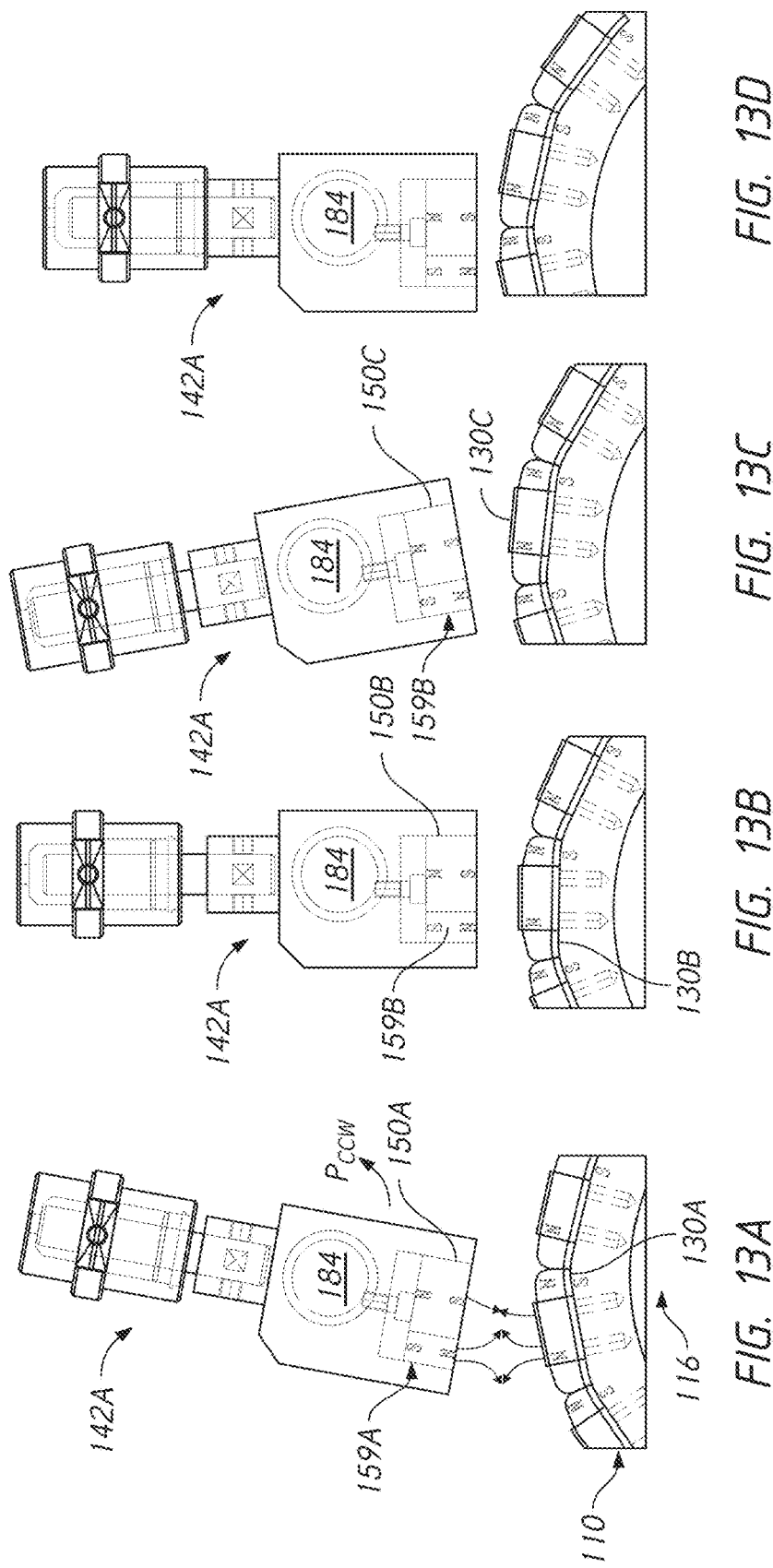

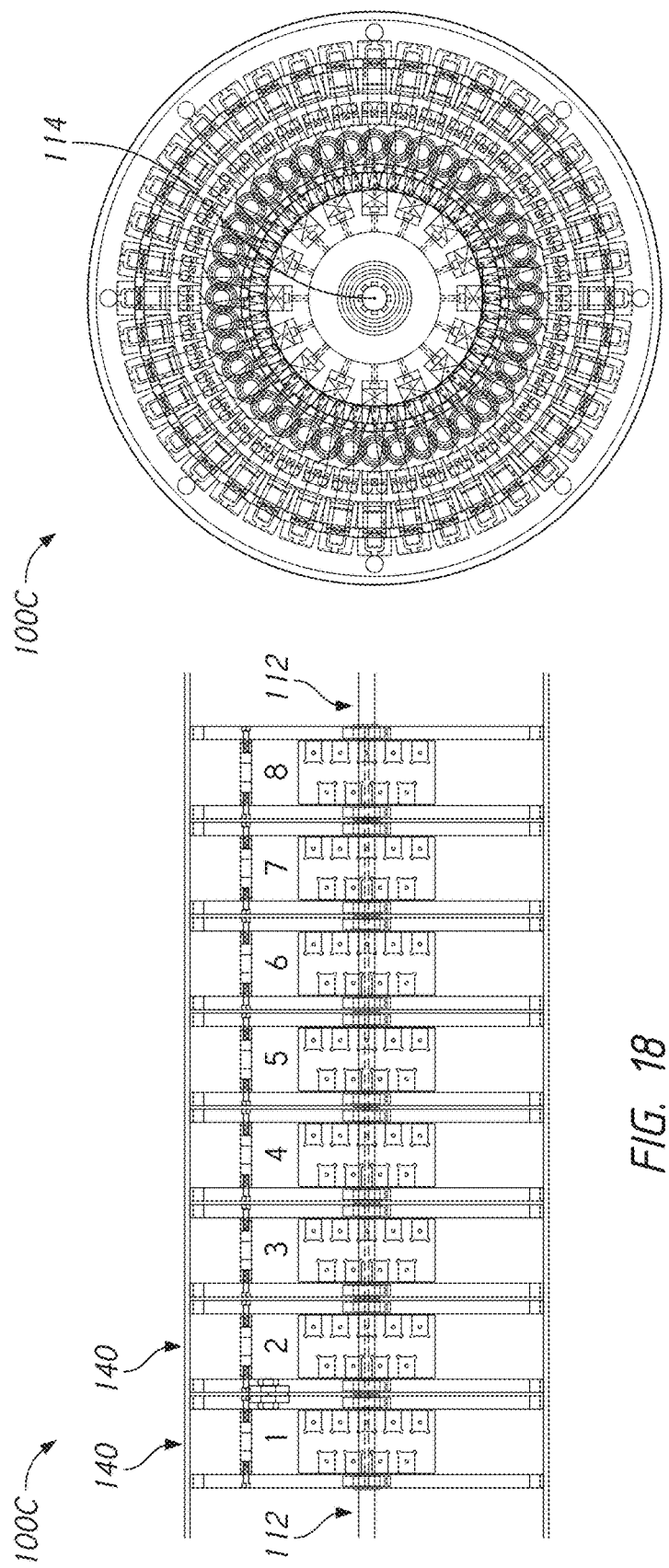

TORQUE AMPLIFYING MAGNETIC DRIVE

BACKGROUND OF THE INVENTION

Field of the Inventions

The present inventions relate to torque amplifying drive mechanisms, such as magnetic, torque amplifying drives.

Description of the Related Art

Some types of conventional torque amplifying drive mechanisms transfer torque from a power source to other devices for performing work through mechanical engagement. For example, gear drives and belt drives can be designed to provide gear reductions which amplify input torque to a higher output torque, at a lower rotational speed.

Other types of magnetic drives include an inner flywheel with permanent magnets and an outer collar with permanent magnets. The flywheel and collar are closely spaced and rotate together at the same rotational speed with no torque amplification.

SUMMARY OF THE INVENTIONS

An aspect of at least one of the inventions disclosed herein includes the realization that a torque amplifying drive can be constructed with a flywheel driven by a reciprocating magnet mount, which reciprocates in a path adjacent to the flywheel, without any direct contact. Additionally, such a drive can be designed to provide an effective gear reduction between the reciprocation of the magnet mount and the rotation of the flywheel.

Thus, according to some embodiments, a torque amplifying magnetic drive can compromise a frame and a least first and second magnetic leg members supported by the frame with the reciprocating connector mechanism configured to guide the first and second magnetic leg members through a reciprocating movement, the first and second magnetic leg members comprising a first end. First and second leg magnets can be disposed at the first end of the first and second magnetic leg members, respectively. A magnetic flywheel can be supported by a rotational shaft. The magnetic flywheel can comprise an outer surface and at least first and second flywheel magnets disposed of the outer surface. The first and second flywheel magnets can be outlined and just opposed with the first and second leg magnets, respectively, during rotation of the magnetic flywheel. The first flywheel magnet can have an opposite polarity to a polarity of the first leg magnet, and the second flywheel magnet can have an opposite polarity to a polarity of the second leg magnet. A drive mechanism can be configured to drive the first and second magnetic legs through a reciprocating movement. The first and second flywheel magnets can be spaced sufficiently close to the first and second leg magnets, respectively, so as to rotate the magnetic flywheel during reciprocation of the first and second magnetic leg members, thereby transferring torque from the first and second magnetic leg members to the magnetic flywheel.

In some embodiments, a torque amplifying magnetic drive comprises a frame, at least first and second magnetic leg members, supported by the frame with a reciprocating connector mechanism configured to guide the first and second magnetic leg members through a reciprocating movement, the first and second magnetic leg members comprising a first end, wherein the reciprocating connector mechanism guides the first and second magnetic leg members through a reciprocating movement comprising an elliptical path, first and second leg magnets disposed at the first end of the first and second magnetic leg members, respectively. The first magnetic leg member comprises a pivot, pivotally mounted to a pivot shaft and a telescoping portion configured to move between retracted and extended states, the first leg magnet being disposed closer to the pivot portion when the telescoping portion is in the retracted state and the first leg magnet being disposed further from the pivot when the telescoping portion is in the extended state. A magnetic flywheel supported by a rotational shaft, the magnetic flywheel comprising an outer surface and at least a first plurality and a second plurality of flywheel magnets disposed at the outer surface, the first and second pluralities of flywheel magnets being aligned and sequentially juxtaposed with the first and second leg magnets, respectively, during rotation of the magnetic flywheel, the first plurality of flywheel magnets having an opposite polarity to a polarity of the first leg magnet, the second plurality of flywheel magnets having an opposite polarity to a polarity of the second leg magnet, wherein the first and second pluralities of flywheel magnets are disposed adjacent to one another, along an axial direction of the flywheel. A drive mechanism configured to drive the first and second magnetic legs through the reciprocating movement, wherein the reciprocating connector mechanism guides the first magnetic leg member through a first portion of the reciprocating movement and a second portion of the reciprocating movement, the first portion of the reciprocating movement comprises a first position of the first magnetic leg member in which the first leg magnet is spaced from an outer surface of the magnetic flywheel at a first spacing, a movement from the first position to a second position at which the first leg magnet is at a minimum spacing from the outer surface of the magnetic flywheel and a third position in which the first leg magnet is spaced from the first flywheel magnet at a third spacing from the outer surface of the magnetic flywheel, the first and third spacings being larger than the minimum spacing. The first and second pluralities of flywheel magnets are sequentially spaced sufficiently close to the first and second leg magnets, respectively, such that the magnetic flywheel is rotated during reciprocation of the first and second magnetic leg members, which thereby transfer torque from the first and second magnetic leg members to the magnetic flywheel by magnetic attraction and repulsion therebetween.

In some variations of the embodiments disclosed herein, the telescoping portion comprises a first telescoping portion fixed to the pivot and a second telescoping portion engaged with the drive mechanism so as to move the second telescoping portion through the reciprocating movement.

In some variations of the embodiments disclosed herein, the drive mechanism comprises a crankshaft supported by the frame, the crankshaft including a throw, the second telescoping portion engaged with the throw of the crankshaft.

In some variations of the embodiments disclosed herein, the elliptical path comprises a major axis extending parallel to a tangent of the outer surface of the magnetic flywheel.

In some variations of the embodiments disclosed herein, the elliptical path of the first leg magnet defines a pinch point gap between an outer surface of the first leg magnet and the outer surface of the magnetic flywheel, the elliptical path comprising a major axis extending generally parallel to a tangent of the outer surface of the magnetic flywheel at the pinch point gap.

In some variations of the embodiments disclosed herein, the first leg magnet comprises a North Pole and a South Pole, wherein a secondary leg magnet is disposed at the first end of the first magnetic leg, the secondary leg magnet comprises a North Pole and a South Pole, wherein the South Pole of the first leg magnet is disposed at the outer surface of the first end and the North Pole of the first leg magnet is disposed inwardly from the outer surface of the first end, and wherein the North Pole of the secondary magnet is disposed at the outer surface of the first end.

In some variations of the embodiments disclosed herein, the first leg magnet is larger than the secondary leg magnet.

In some variations of the embodiments disclosed herein, the first leg magnet is disposed in a leading position of the reciprocating movement and the secondary magnet is disposed in a trailing position relative to the reciprocating motion.

In some variations of the embodiments disclosed herein, the first and second magnetic leg members move in a walking movement and thereby transfer torque to the flywheel through interaction of the first and second leg magnets and first and second flywheel magnets, respectively.

In some embodiments, a torque amplifying magnetic drive comprises a frame, at least first and second magnetic leg members, supported by the frame with a reciprocating connector mechanism configured to guide the first and second magnetic leg members through a reciprocating movement, the first and second magnetic leg members comprising a first end, first and second leg magnets disposed at the first end of the first and second magnetic leg members, respectively, a magnetic flywheel supported by a rotational shaft, the magnetic flywheel comprising an outer surface and at least first and second flywheel magnets disposed at the outer surface, the first and second flywheel magnets being aligned and juxtaposed with the first and second leg magnets, respectively, during rotation of the magnetic flywheel, the first flywheel magnet having an opposite polarity to a polarity of the first leg magnet, the second flywheel magnet having an opposite polarity to a polarity of the second leg magnet. A drive mechanism can be configured to drive the first and second magnetic legs through the reciprocating movement, wherein the first and second flywheel magnets are spaced sufficiently close to the first and second leg magnets, respectively, so as to rotate the magnetic flywheel during reciprocation of the first and second magnetic leg members, thereby transferring torque from the first and second magnetic leg members to the magnetic flywheel.

In some variations of the embodiments disclosed herein, the reciprocating connector mechanism guides the first and second magnetic leg members through an elliptical path.

In some variations of the embodiments disclosed herein, the magnetic flywheel comprises a first plurality of flywheel magnets aligned circumferentially with the first flywheel magnet and a second plurality of flywheel magnets aligned circumferentially with the second flywheel magnet.

In some variations of the embodiments disclosed herein, the first magnetic leg member comprises a pivot, pivotally mounted to a pivot shaft and a telescoping portion configured to move between retracted and extended states, in which the first leg magnet is disposed closer to the pivot portion when the telescoping portion is in the retracted state and the first leg magnet is disposed further from the pivot when the telescoping portion is in the extended state.

In some variations of the embodiments disclosed herein, the telescoping portion comprises a first telescoping portion fixed to the pivot and a second telescoping portion engaged with the drive mechanism so as to move the second telescoping portion through the reciprocating movement.

In some variations of the embodiments disclosed herein, the first leg magnet comprises a North Pole and a South Pole, wherein a secondary leg magnet is disposed at the first end of the first magnetic leg, the secondary leg magnet comprises a North Pole and a South Pole, wherein the South Pole of the first leg magnet is disposed at the outer surface of the first end and the North Pole of the first leg magnet is disposed inwardly from the outer surface of the first end, wherein the North Pole of the secondary magnet is disposed at the outer surface of the first end.

In some variations of the embodiments disclosed herein, the first leg magnet is larger than the secondary leg magnet.

In some variations of the embodiments disclosed herein, the reciprocating connector mechanism guides the first magnetic leg member through a first portion of the reciprocating movement and a second portion of the reciprocating movement, the first portion of the reciprocating movement comprises a first position of the first magnetic leg member in which the first leg magnet is spaced from the first flywheel magnetic at a first spacing, a movement from the first position to a second position at which the first leg magnet is at a minimum spacing from the first flywheel magnet and a third position in which the first leg magnet is spaced from the first flywheel magnet at a third spacing, the first and third spacing being larger than the minimum spacing.

In some variations of the embodiments disclosed herein, the first and second magnetic leg members move in a walking movement and thereby transfer torque to the magnetic flywheel through interaction of the first and second leg magnets and the first and second flywheel magnets, respectively.

In some variations of the embodiments disclosed herein, the first and second portions of the reciprocal movement form an elliptical path.

In some embodiments, a torque amplifying magnetic drive comprises a frame, at least a first magnetic leg member supported by the frame with a pivot mechanism and an linear extension guide, the pivot mechanism configured to allow the first magnetic leg member to pivot about a pivot point fixed relative to the frame, the linear extension guide configured to allow the first magnetic leg member to move between retracted and extended positions along a longitudinal direction of the magnetic leg member, a first leg magnet disposed at an end of the first magnetic leg member; wherein the first leg magnet is disposed closer to the pivot point when the first magnetic leg member is in the retracted state and wherein the first leg magnet is disposed further from the pivot point when the first magnetic leg member is in the extended state, and a magnetic flywheel supported by a rotational shaft, the magnetic flywheel comprising an outer surface and at least a first plurality of flywheel magnets disposed at the outer surface. A drive mechanism is configured to drive the first magnetic leg member through the a reciprocating movement comprising pivoting about the pivot point, extension, and retraction along the longitudinal direction of the magnetic leg member, wherein the first plurality of flywheel magnets are sequentially spaced sufficiently close to the first leg magnet during rotation of the magnetic flywheel such that torque is transferred from the first magnetic leg member to the magnetic flywheel and thereby the magnetic flywheel is rotated during reciprocation of the first magnetic leg member.

In some variations of the embodiments disclosed herein, the first leg magnet has a first polarity at the lower end of the first magnetic leg member and the first plurality of flywheel magnets have a second polarity at the outer surface of the magnetic flywheel, the first polarity being opposite to the second polarity.

Some variations of the embodiments disclosed herein additionally comprise a second magnetic leg member having a second leg magnet and mounted to the frame with a second pivot aligned with the first pivot point.

Some variations of the embodiments disclosed herein additionally comprise a second plurality of flywheel magnets disposed at the outer surface.

In some variations of the embodiments disclosed herein, the second plurality of flywheel magnets have a third polarity at the outer surface of the flywheel, the third polarity being opposite to the second polarity.

In some embodiments, a torque amplifying magnetic drive comprises a frame, at least a first magnetic leg member supported by the frame, a first leg magnet disposed at an end of the first magnetic leg member, a magnetic flywheel supported by a rotational shaft, the magnetic flywheel comprising an outer surface and at least a first plurality of flywheel magnets disposed at the outer surface, and a drive mechanism configured to drive the first magnetic leg member through the a reciprocating movement adjacent to the outer surface of the magnetic flywheel. The first plurality of flywheel magnets are sequentially spaced sufficiently close to the first leg magnet during rotation of the magnetic flywheel such that torque is transferred from the first magnetic leg member to the magnetic flywheel and thereby the magnetic flywheel is rotated during reciprocation of the first magnetic leg member.

BRIEF DESCRIPTION OF THE DRAWINGS

FIG. 9 is a front elevational view of a magnetic leg member.

FIG. 10 is an enlarged view of the magnetic leg assembly, including two of the magnetic leg members of FIG. 9.

FIG. 11 includes side elevational and front elevational views of a part of a crankshaft of the magnetic leg member assembly.

FIG. 12A is a partial front elevational view of a magnetic leg member interacting with a magnetic flywheel, in a first position FIG. 12B is a further view of the magnetic leg member and magnetic flywheel, in a position in which the magnetic leg member is closest to the flywheel defining a pinch point gap.

FIG. 12C is a further partial front elevational view illustrating a further movement of the magnetic leg member and flywheel.

FIG. 12D is a further front elevational view of the magnetic leg member in a position in which the magnetic leg is furthest from the flywheel, prior to returning to the position of FIG. 12A.

FIG. 13A is a partial front elevational view of a modified magnetic leg member and magnetic flywheel first position.

FIG. 13B is a further front elevational view of the magnetic leg member of FIG. 13A in a second position in which the magnetic leg member is closest to the flywheel defining a pinch point gap.

FIG. 13C is a further front elevational view of the magnetic leg member of FIG. 13A in a third position.

FIG. 13D is a further front elevational view of the magnetic leg member of FIG. 13A in a fourth position in which the magnetic leg member is furthest from the flywheel.

FIG. 18 is a schematic side elevational view of an embodiment of the magnetic drive having the eight sets of magnetic leg members of FIG. 17 arranged axially and paired with eight magnetic flywheel assemblies.

FIG. 19 is a front elevational and partial sectional view of the embodiment of FIGS. 16 through 18 having eight sets of five pairs of magnetic leg members totaling 80 leg members.

DETAILED DESCRIPTION OF THE PREFERRED EMBODIMENT

The present disclosure includes descriptions of numerous inventions associated with magnetic drives. Which can be used for many different applications, including but without limitations, pumps, automobile or watercraft propulsion systems, conveyer systems, solar power generation, power storage systems, and other uses.

The magnetic drives disclosed herein can be configured to amplify the torque of the incoming power. For example, in some embodiments, a magnetic drive can be configured to provide, in a contactless manner, transfer of torque from a source to an output shaft. In some embodiments, the magnetic drive includes magnets disposed on a flywheel and magnets disposed on a reciprocating mount configured to transfer torque by way of magnetic interaction between the magnets. In some embodiments, the magnetic drive can provide a gear reduction which can provide a torque amplification. Further, in some embodiments, a magnetic drive can provide a greater torque amplification than that provided by resulting gear reduction.

Figure 1:
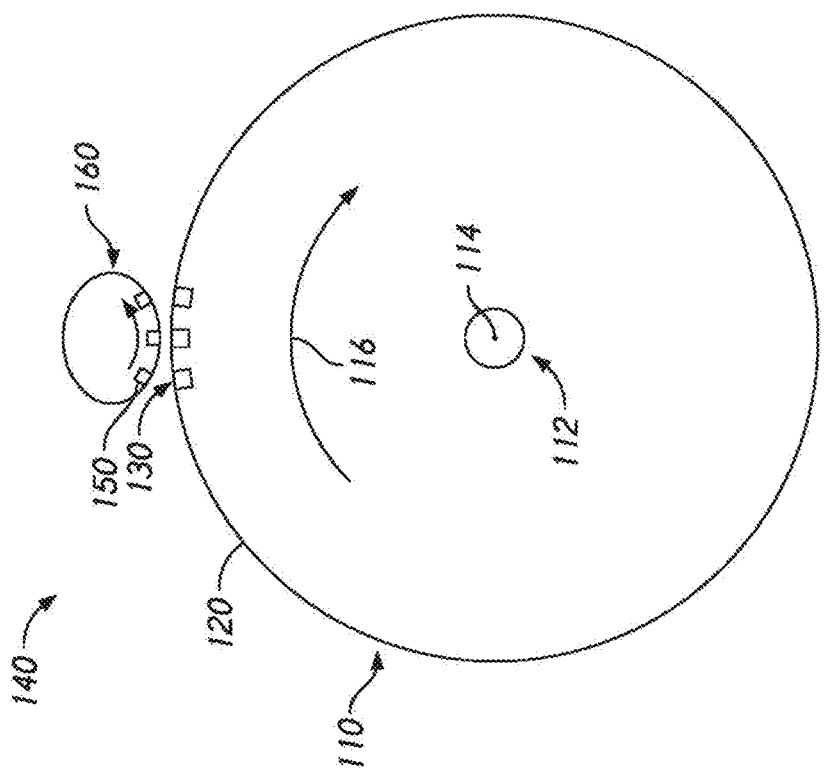
FIG. 1 is a schematic diagram illustrating relative movements of components of an embodiment of a magnetic drive.

With reference to FIG. 1, a magnetic drive 100 can include a flywheel 110 is mounted to a flywheel shaft 112 for rotation about a flywheel axis 114. The flywheel 110 can include an outer surface 120 and at least one flywheel magnet 130.

A reciprocating magnet assembly 140 can include at least one magnet 150 mounted for reciprocal movement around a reciprocation path 160. The reciprocation path 160 can be circular, oval, elliptical or other shapes. Additionally, the magnet 150 can rotate around the path 160 or can be laterally and vertically translated (as viewed in FIG. 1) around the reciprocal path 160. The polarity of the exposed surface of the magnet 150 is opposite to the polarity of the exposed surface of the magnet 130.

Thus, during operation, as the flywheel 110 rotates in the direction of flywheel rotation 116, the magnet 130 also rotates in the direction of flywheel rotation 160. As viewed in FIG. 1, the direction 116 is clockwise. Additionally, during operation, the magnet 150 moves around the reciprocation path 160 in a counterclockwise direction.

In the orientation illustrated in FIG. 1 during operation, because the exposed surfaces of the magnets 130, 150 are of opposite polarity, the magnets 130, 150 attract each other. Thus, movement of the magnet 150 around the reciprocation path 160, for example, in the counterclockwise direction illustrated in FIG. 1, causes an attractive force on the magnet 130, thereby causing the magnet 130 and the flywheel 110 to rotate the clockwise direction 160.

This movement forms the basis of the principal of operation of the magnetic drive 100. In the embodiments described above, the multiple magnets on the flywheel 110 and continued reciprocal movement of the reciprocation mechanism 140 causes a continuous motion of the flywheel 110. Additionally, some embodiments below include a plurality of reciprocation mechanisms 140.

As such, mechanism 140 engages the flywheel 110 in a manner similar to that of engagement of a set of meshed gears, although with a contactless transfer of torque from the mechanism 140 to the flywheel 110.

Figure 2:
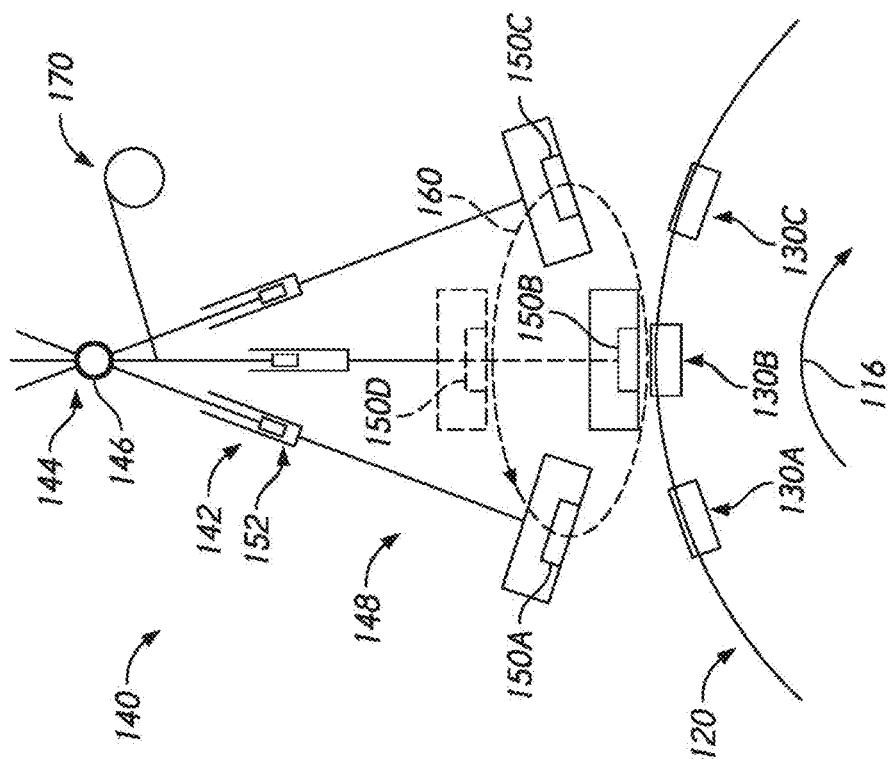
FIG. 2 is a schematic diagram showing an optional embodiment of components of the magnetic drive and illustrating relative movements of components thereof.

FIG. 2 is a further schematic illustration of the reciprocating drive mechanism 140. The mechanism 140 comprises of leg assembly 142. The leg assembly 142 includes a first end 144 connected to a pivot 146 and a lower end 148. The magnet 150 is secured to the lower end 148. The leg assembly 142 also includes an extension mechanism 152 that guides the leg assembly 142 between retracted and extended states.

For example, when the magnet 150 is at the position identified as 150B, the extension mechanism 152 is at its most extended state. In this state, the lower surface of the magnet 150 is at its closest position to the outer surface of the flywheel 120, and during operation, the outer surface of the magnet 130 is in the position 130B. In this position, the magnets 130, 150 define a pinch point gap, i.e., the closest spacing achieved during operation.

When the leg assembly 142 is in the position corresponding to magnet position 150C, the extension mechanism 152 is in essentially the same orientation as when the magnet is at position 150A. With continued movement around the reciprocal path 160, the leg assembly reaches a position wherein the magnet is at position 150D. This is the position at which the magnet 150 is spaced furthest from the outer surface of the flywheel 120. With continued movement around the reciprocation path 160, the magnet returns to the position 150A.

Figure 3:
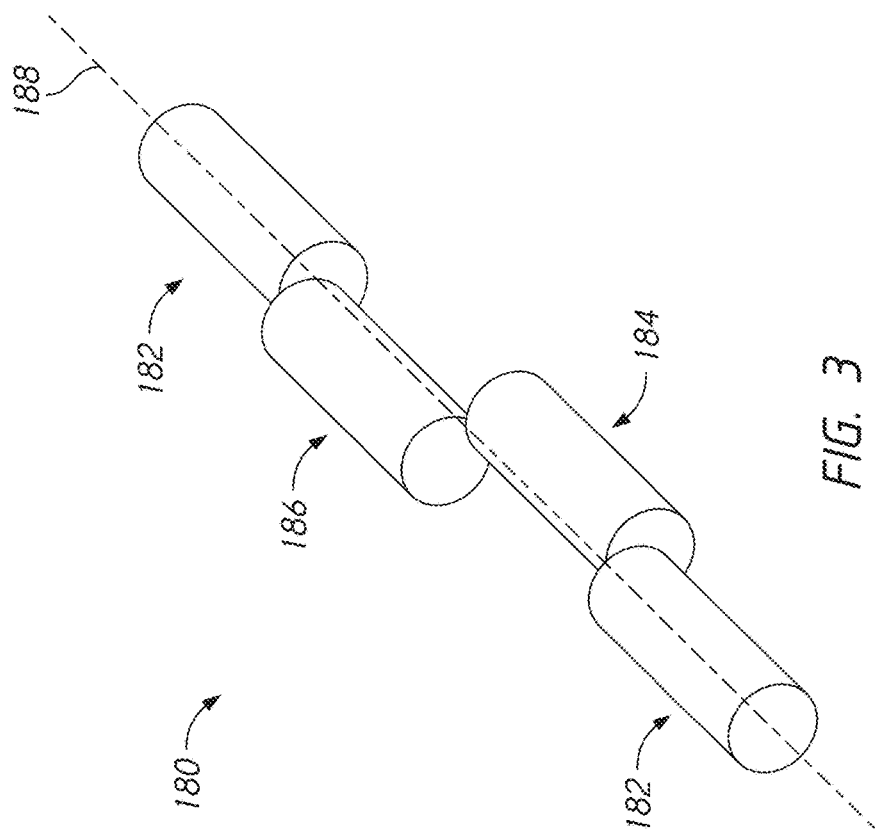
FIG. 3 is a perspective view of an embodiment of crankshaft that can be used in conjunction with the magnetic drive.

The reciprocation mechanism 140 can also include a pivot mechanism 170. The pivot mechanism 170 can be configured to pivot the leg assembly 152 back and forth between the angles associated with magnet positions 150A, 150B, and 150C. Additionally, the pivot mechanism 170 can be configured to also cause extension and retraction of the extension mechanism 152. For example with reference to FIGS. 3 and 4, the pivot mechanism 170 can include a crankshaft 180 (FIG. 3) and a follower mechanism 172 (FIG. 4).

The crankshaft 180 can include mounting portions 182 at axial ends thereof, and crankshaft throws 184, 186. The crankshaft 180 can be configured for rotation about a crankshaft axis 188.

Figure 4:
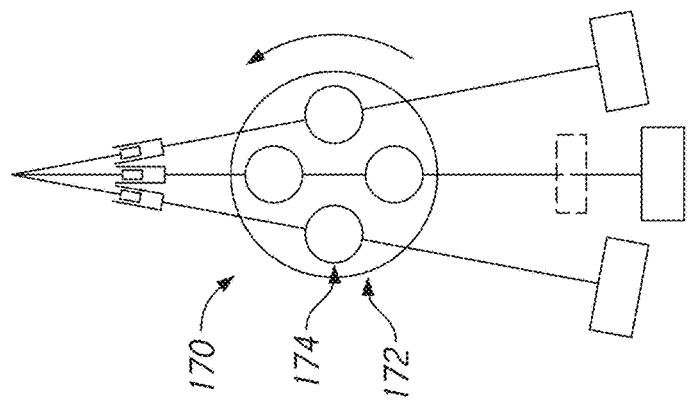
FIG. 4 is a schematic diagram illustrating movements of and the interaction of certain components of the magnetic drive, for producing an elliptical reciprocating movement.

With reference to FIG. 4, the follower 172 can include at least one aperture 174 configured to engage with a throw of the crankshaft 180, such as throw 184. Thus, rotation of the crankshaft 180 causes the follower aperture 174 to rotate in the direction of the rotation of the crankshaft 180. Additionally, movement of the follower aperture 174 causes the extension mechanism 152 (FIG. 2) to move upward and downward, i.e., between its extended and retracted states. The combined motion of pivoting left and right as viewed in FIGS. 2 and 4 and the extension and retraction results in the elliptical shape of the reciprocation path 160.

Thus, during operation, with reference to FIG. 2, the magnet 150 moves along a portion of the path 160 that is substantially parallel to a tangent of the outer surface 120 of the flywheel 110 and thereby magnetically engage with the magnet 130, particularly in the positions 150B, 130B as well as around the positions.

FIGS. 5-12D illustrate a modification of the magnetic drive 100, including various further optional features and hardware.

Figure 5:
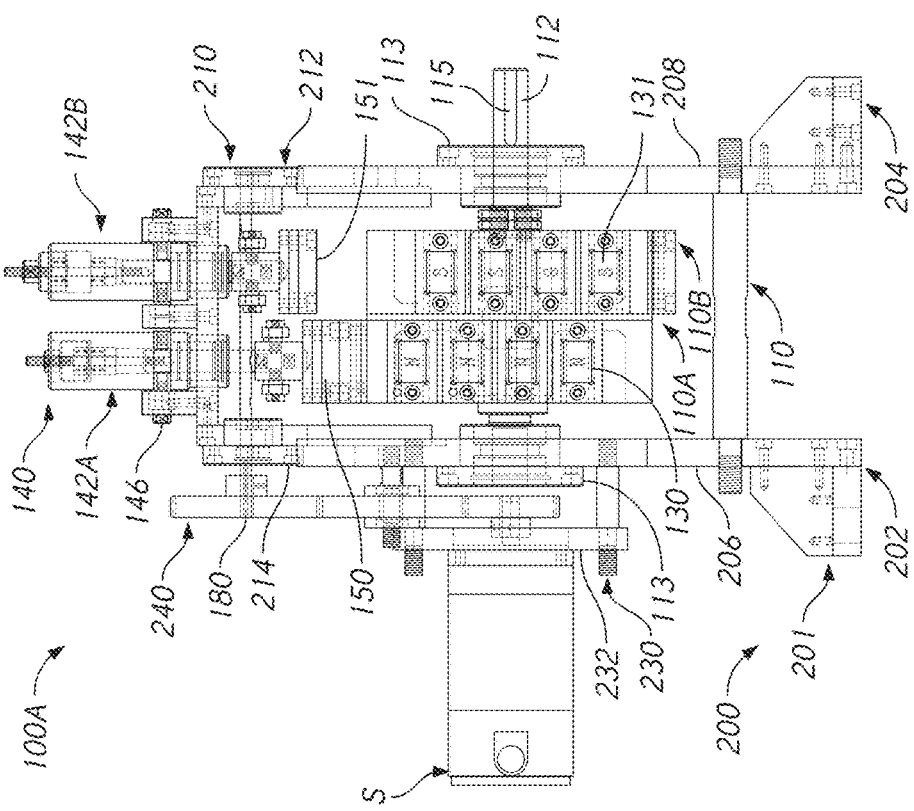
FIG. 5 is a side elevational view of an embodiment of the magnetic drive of FIGS. 1-4 including the magnetic flywheel assembly having two adjacent flywheels and a pair of reciprocating magnetic leg members.

With reference to FIG. 5, the magnetic drive 100A includes a frame 200 configured to support the reciprocation mechanism 140. Optionally, the frame 200 can also be configured to support the flywheel assembly 110.

In the illustrated embodiment, with continued reference to FIG. 5, the frame assembly 200 includes a lower frame assembly 201 including legs 202, 204 and upright support plates 206, 208. The legs 202, 204 are configured to form support assemblies for supporting the magnetic drive 100A on a flat surface. Other configurations for the legs 200, 204 can also be used. The support plates 206, 208 extend upwardly from the lower portion 201 to an upper portion 210.

The upper portion 210 of the frame assembly 200 includes upright support portions 212, 214 configured to support the reciprocation mechanism 140 in a fixed position relative to the flywheel shaft 112.

As noted above, the frame assembly 200 can be configured, optionally, to support the flywheel 110. In illustrated embodiment, the flywheel 110 includes a first flywheel member 110A and a second flywheel member 110B, described in greater detail with reference to FIGS. 7 and 8. In the illustrated embodiment, the upright support plates 206, 208 include bearings 113 supporting the flywheel shaft 112. The flywheel shaft 112 includes one or more keyways 115 at various locations along the length of the flywheel shaft 112 for providing a positive engagement between the flywheel members 110A, 110B and further downstream components to support the transfer of torque, as is well known in the art.

Figure 6:
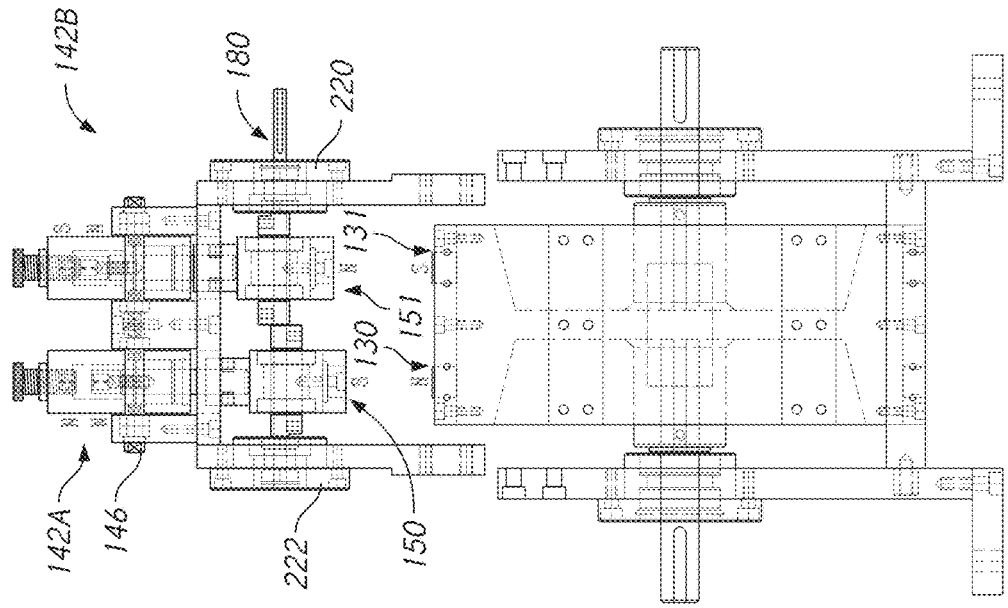
FIG. 6 is a further side elevational end partially exploded view of the embodiment FIG. 5.

The upward portion of the frame 210, with reference to FIG. 6, includes shaft mounts 220, 222 for supporting the crankshaft 180. As described in greater detail below with reference to FIGS. 9-11, the crankshaft 180 drives the magnetic leg assemblies 142A, 142B through reciprocating motions.

With reference to FIG. 5, the source S is in the form of an electric motor. In the illustrated embodiment, the source S is mounted to the upright plate 206 with a motor mount assembly 230 and a reciprocating mechanism drive 240. The motor mount 230, in the illustrated embodiment, includes a motor mounting plate 232 secured to a front face of the electric motor and mounted to the upright plate 206 with a plurality of mounting bolts, in an arrangement well known in the art.

The reciprocating drive 240 can include a belt drive and optionally, a gear reduction achieved using a larger drive pulley mounted to the crankshaft 180 in a smaller drive pulley mounted to the source S. However, any gear ratio can be used.

Figure 8:
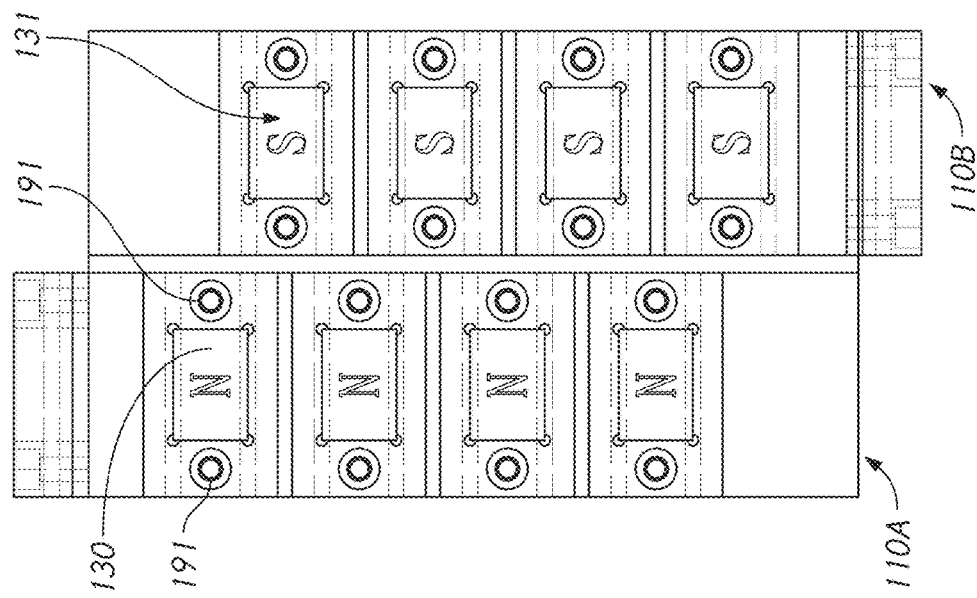
FIG. 8 is a side elevational view of the flywheel assembly of FIG. 2.
Figure 7:
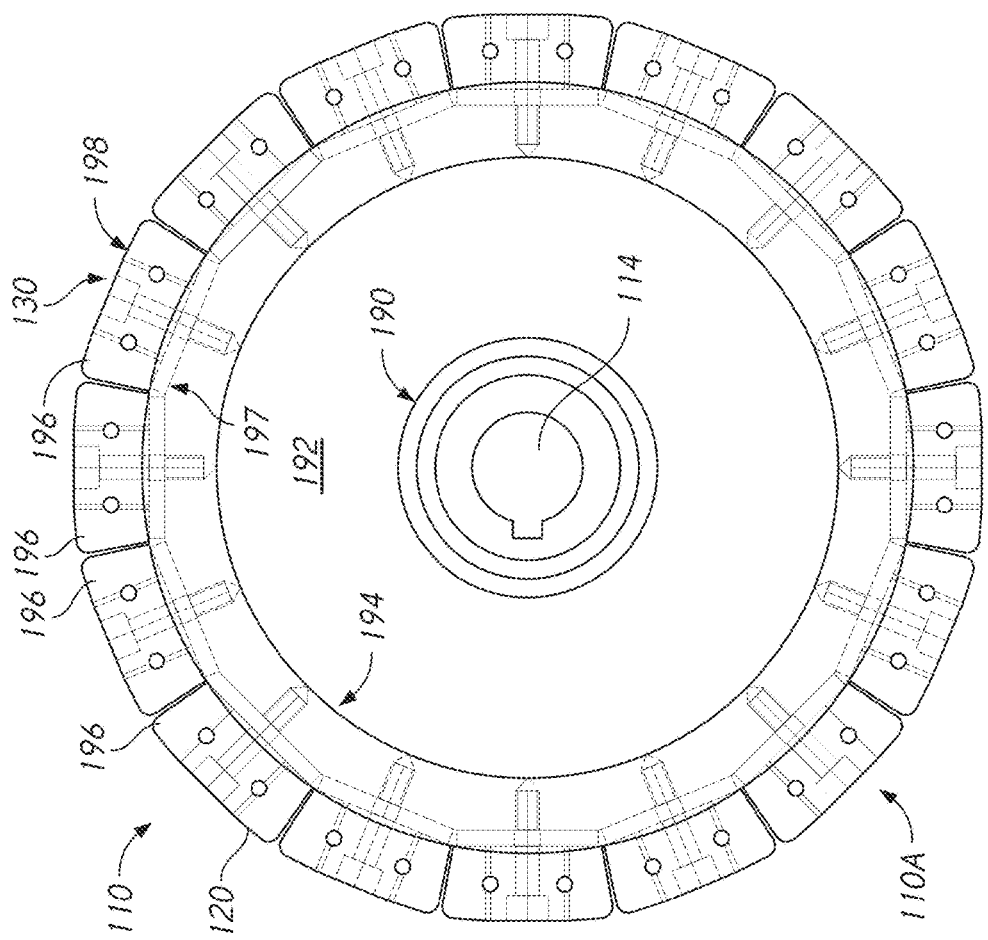
FIG. 7 is a front elevational view of a flywheel assembly of the embodiment of FIG. 5.

With reference to FIGS. 7 and 8, the flywheel assembly 110 can include two or more flywheels, and in the illustrated embodiment, includes first and second flywheels 110A, 110B. With reference to FIG. 7, the flywheel 110 is shown in front elevational view. The flywheel 110A includes a hub 190, a web 192, a rim 194, and a plurality of magnet mount assemblies 196 disposed around the periphery of the rim 194. The magnet mount assemblies 196 define the outer surface 120 of the flywheel 110A.

Each of the magnetic mount assemblies 196 comprises a mounting plate 197 and a magnet bushing 198. In each of the bushings 198 a magnet 150 is mounted. In the illustrated embodiment, as shown in FIG. 8, two bolts 191 are used to hold in each of the magnets 130.

The flywheel 110A includes a plurality of magnets 130, each of which have a north polarity facing outwardly around the outer surface 120. In the illustrated embodiment, the flywheel 110A includes 16 magnets 130, evenly spaced around the circumference of the outer surface 120.

The flywheel 110B, which his mounted adjacent to the flywheel 110A includes a plurality of magnets 131 mounted in essentially the same way with the same hardware as the flywheel 110A, except that the magnets 131 have a south polarity facing outward at the outer surface 120.

Additionally, as shown in FIG. 8, the magnets 130, 131 are offset from each other in a rotational direction. In the illustrated embodiment in which the flywheels 110A, 110B, each includes 16 magnets evenly spaced around the circumference surface therefore, each of the magnets 130 are spaced from one another at 22.5 degrees and each of the magnets 131 are spaced from each other by approximately 22.5 degrees. With reference to FIG. 8, the magnets 130, 131 are also offset from one another by approximately 11.25 degrees, or in other words, halfway between the magnets 130.

The arrangement illustrated in FIG. 18 can provide a further advantage. For example, because the magnets 130 and magnets 131 are arranged with their poles in opposite orientations, i.e., the magnets 130 have their north polarity at the outer surface 120 and the magnets 131 have their south polarity at the outer surface 120, the magnets 130, 131 can generate a net attractive force between the two flywheels 110A, 110B. As such, the flywheels 110A, 110B can abut one another directly, and/or with a spacer, and thereby avoid imparting a compressive or tensile load on the flywheel shaft 112. Other configurations an also be used.

With reference to FIGS. 9-10 the magnetic leg assembly 142A can be configured to pivot about the pivot assembly 144 and to follow the motion of the crankshaft throw 180, and thereby move through a reciprocating, elliptical motion.

With continued reference to FIG. 9, the magnetic leg member assembly 142A can include a magnetic mount portion 148 which holds the magnet 150A. In the illustrated embodiment, the magnet 150A includes a south polarity at its lower surface, the surface which faces and is just opposed to the outer surface 120 of the flywheel 110 during operation. The north pole of the magnet 150A is disposed inwardly from the south pole, i.e., closer to the crankshaft throw 184. Optionally, the magnetic mount 148 can include a bearing 175 disposed within the aperture 174 (described above with reference to FIG. 4).

The upper portion of the magnetic leg assembly 142A includes the pivot assembly 146 which can be in the form of a bore hole configured to receive a pivot pin (149 in FIG. 10). The magnetic leg assembly 142A can include a pivot bore 146 on opposite sides thereof. Optionally, the two bores 146 can be provided in a collar member 151, with one bore hole 146 on each side of the assembly 142A.

The magnetic leg assembly 142A can also include a plurality of pivot pins 149 (FIG. 10) so that the magnetic leg assembly 142A can pivot clockwise and counterclockwise as viewed in FIG. 9, about the pivot axis defined by the pivot bores 146. The upper portion of the assembly 142A can also include the extension mechanism 152. The extension mechanism 152 can include a central member, for example, in the form of a rod 260 fixed to the magnetic mount portion 148. The upper end of the rod 260 can be received within a bore 262. The bore 262 and the rod 260 can be sized such that the rod 260 can slide upwardly and downwardly (as viewed in FIG. 9) with the bore 262.

Optionally, the magnetic leg assembly 142A can include a biasing member assembly 263 disposed within the bore 262. For example, in some embodiments, the assembly 142A can include a first magnet 264 mounted to the rod 260 and a second magnet 266 mounted to the pivot assembly 144. The magnets 264, 266 can be arranged with opposite facing polarity so as to generate a repulsive force therebetween. In other embodiments, the biasing member 263 can be in the form of a spring. Optionally, in some embodiments, the assembly 142A does not include any biasing member. Rather, the rod 260 is free to slide within the bore 262 in such embodiments.

Further, in some embodiments, the assembly 142A can include a secondary magnet 159 disposed adjacent to the magnet 150A. In some embodiments, the secondary magnet 159 can be arranged with opposite polarity, i.e., with a north polarity at the outer surface of the assembly 142A and adjacent to the south polarity of the magnet 150A. In some embodiments, the secondary magnet 159 can be smaller than the magnet 150A. The interaction of these magnets and the magnets on the flywheel 110 are described in greater detail below with reference to FIGS. 13A-13B.

During operation, as the crankshaft 180 rotates thereby causing the crankshaft throw 184 to revolve around the pivot axis 188, the follower aperture 174 moves through a circular path, along with the crankshaft throw 184. However, the because the assembly 142A is also mounted to pivot about the pivot bore 146, the magnet 150A moves in an extension direction E, a retraction direction R and a clockwise Pivot $P_{cw}$ and a counterclockwise pivoting direction $P_{ccw}$. The resulting motion is elliptical as described above with reference to FIG. 2.

With reference to FIG. 11, the crankshaft can be built up of several components. For example, the crankshaft throws 184, 186 can be formed with sleeve portions 270, 272. The sleeves can include an offset bore 274, offset from a central axis of the sleeves 270, 272, so as to create the eccentric orientation for forming the throws 184, 186. Additionally, the crankshaft 180 can include throw collars 276 disposed at both ends of each of the sleeves 270, 272 so as to fix the axial location of the sleeves 270, 272, relative to a central shaft 278 extending through the bores 274 and each of the collars 276. Each of the collars can also include a set screw bore 279 for accommodating set screws for fixing the location of the collars 276 along the shaft 278.

Additionally, the shaft 278 can include one or more keyways for rotationally fixing the sleeves 270, 272 relative to the shaft 278. Assembled as such, the shaft 278 rotates about the crankshaft axis 188 and the offset eccentric configuration of the sleeves 270, 272 effectively form the throws 184, 186 and the up and down motion causing the retraction of the assembly 142A and the Retraction direction and the extension of the assembly 142A and the Extension direction.

The magnetic leg assembly 142B can be essentially the same as the magnetic leg assembly 142A except that the magnet 150B mounted to the lower end of the assembly 142B has the opposite polarity. Additionally, because the throw 186 is offset from the throw 184 by 180 degrees, the movement of the magnetic leg member assembly 142B is 180 degrees at a phase with the movement of the assembly 142A.

With reference to FIGS. 12A-12D, the magnetic leg assembly 142A interacts with the flywheel in order to transfer torque from the assembly 142A to the flywheel 110. For example with reference to FIG. 12A, the leg assembly 142A is disposed in its leftward most position, with the magnet 150 in the position 150A described above with reference to FIG. 2. In this position, the leg magnet 150 and the flywheel magnet 130 are approaching each other during rotation of the flywheel 110 in the clockwise direction 116. The magnets 150, 130 attract each other because their juxtaposed surfaces have opposite magnetic polarity. Thus, as the magnetic leg assembly 142A is pivoted in the counterclockwise direction about the pivot 144, the magnet 150 attracts and thereby causes the magnet 130 to follow it, thereby driving the flywheel 110 in the direction 116. Eventually, the assembly 142A pivots sufficiently to move the magnet 150 to the position 150B.

In the position 150B, the lower surface of the magnet 150 is the closest to the outer surface 120 of the flywheel 110, thereby defining the pinch point gap between the assembly 142A and the outer surface 120 of the flywheel 110. As the assembly 142A reaches the rightward most position (as viewed in FIG. 2) it changes direction and begins to pivot toward the left of the figure and move through the upper portion of its elliptical movement, as described above with reference to FIG. 2. As the magnet 150 is in the position 150C at this point, and is moved away from the magnet 130, thereby reducing the effect of the attraction between the magnets 150, 130.

With reference to FIG. 12, as the assembly 142A is pivoted further in the leftward direction, it moves to its upper most position, as viewed in FIG. 2, with the magnet in the position 150D. In this position, the magnet 150D is spaced the further distance from the outer surface 120 of the flywheel 110. At this position, as the assembly 142A begins its further pivoting towards the position 150A (FIG. 12A), the magnet 150 becomes attracted to the next magnet 130 on the flywheel with the magnetic attraction thereby assisting the movement of the assembly 142A toward the magnet 130, as well as rotation of the flywheel 116.

With the crankshaft configured as described above, more specifically with the crankshaft throw 186 mounted 180 degrees out of phase with the crankshaft throw 184, the magnetic leg assembly 142B moves such that the magnet 151 is at position corresponding to 150C when the magnet 150 is at position 150A. This out of phase movement helps provide a more continuous transfer of torque to the flywheel during operation.

With reference to FIGS. 13A-13D as noted above, the magnetic leg assembly 142A can include an optional secondary magnet 159. The position of the magnet 159 in the various positions illustrated in FIGS. 13A-13D are identified as 159A, 159B, 159C, 159D similar to the positions 150A, 150B, 150C, 150D of magnet 150 described above with reference to FIGS. 12A-12D. The additional influences of the secondary magnet 159 are described below.

As noted above, the magnet 150 can be larger than the secondary magnet 159. Thus, with reference to FIG. 13A, as the assembly 142A pivots in a counterclockwise direction, the attraction between the magnet 150 and the magnet 130 is larger than the repulsive force created by the interaction of the secondary magnet 159 with the magnet 130. Thus, the attractive force between the magnets 150, 130 draw these magnets toward each other and rotate the flywheel 110 in a direction 116 so as to follow the movement of the assembly 142A. Additionally, in the position of FIG. 13B, the larger magnet 150 creates an attractive force with the flywheel magnet 130 overcoming the repulsive force created by the secondary magnet 159. However, in the position of FIG. 13C, the repulsive force generated by the secondary magnet 159 can help push the leg assembly 142A up and away from the flywheel 110, in the direction of the movement of the assembly 142A. Thus, the secondary magnet 159 can help assist the movement of the magnet 150 away from the magnet 130 and thus continue its movement toward the position illustrated in FIG. 13B.

Figure 15:
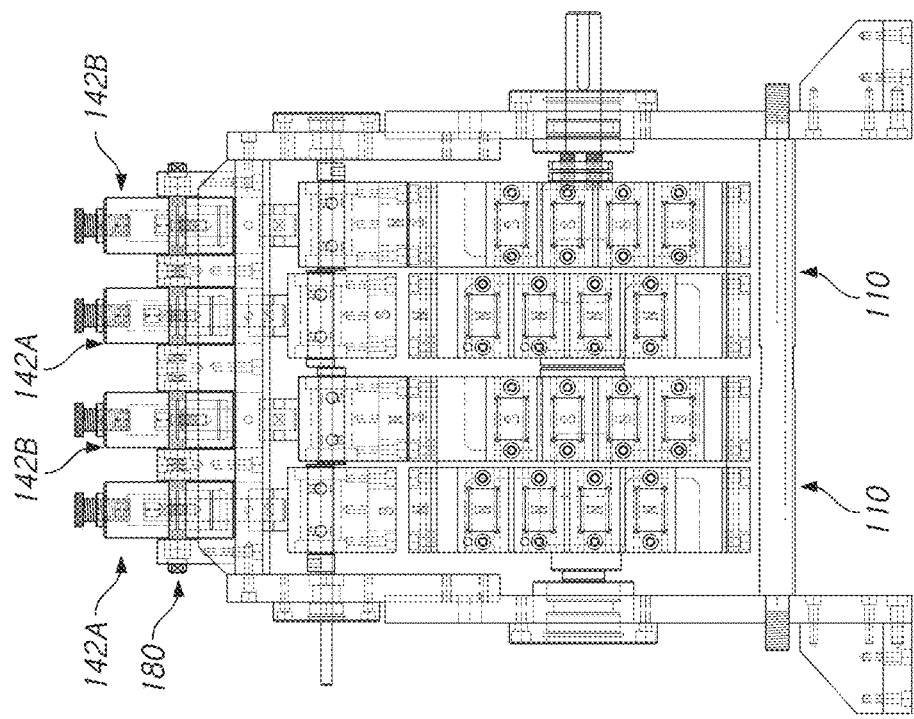
FIG. 15 is a side elevational view of the embodiment of FIG. 14.
Figure 14:
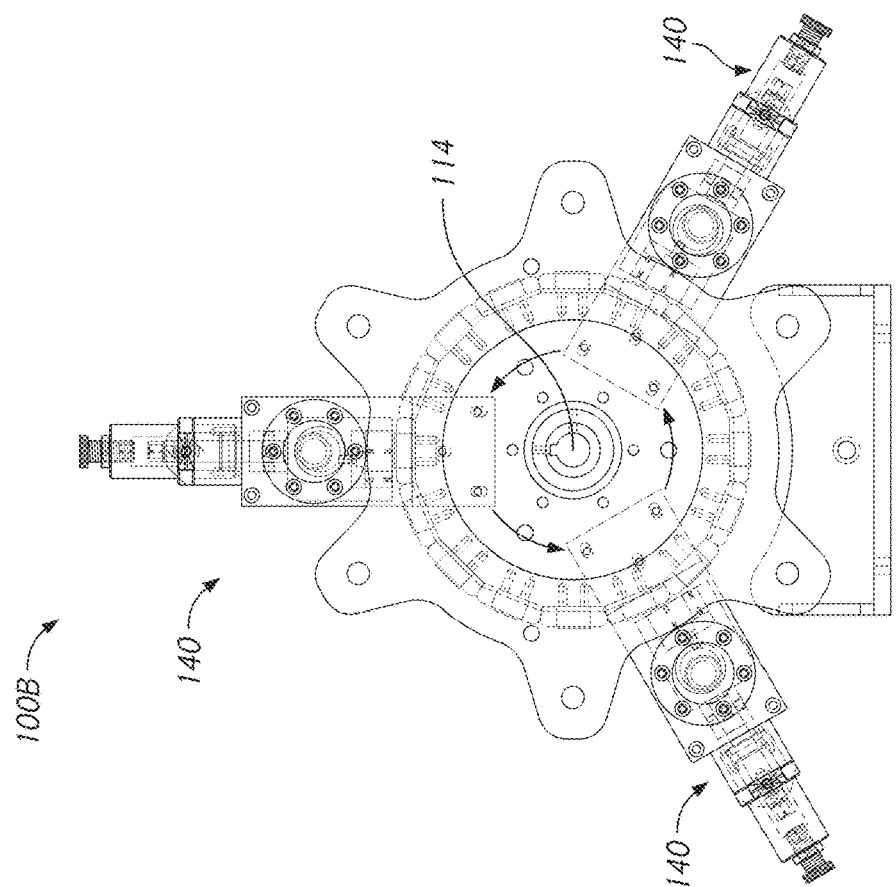
FIG. 14 is a partial front elevational view of a further embodiment of the magnetic drive, including three sets of magnetic leg members, each set including four leg members.

With reference to FIGS. 14-15, a further modification of the magnetic drive 100 is illustrated therein and identified generally by the reference numeral 100B. In this modification, the drive 100B can include three sets of reciprocating mechanisms 140, each separated from each other by approximately 120 degrees around the flywheel axis 114. However, other numbers of reciprocating mechanisms 140 can also be used.

With reference to FIG. 15, each of the reciprocating mechanisms 140 can include four leg member assemblies. For example, the assemblies can be two sets of he assemblies 142A, 142B described above with reference to FIGS. 9-11. Additionally, each one of the reciprocating mechanisms 140 can include a single crankshaft 180 including four throws, and thereby driving all of the magnetic leg member assemblies 142A, 142B with a single crankshaft.

With reference to FIGS. 16-19, another modification of the magnetic drive 100 can include a greater number of reciprocating assemblies 140 and is generally identified by the reference numeral 100C.

Figure 16:
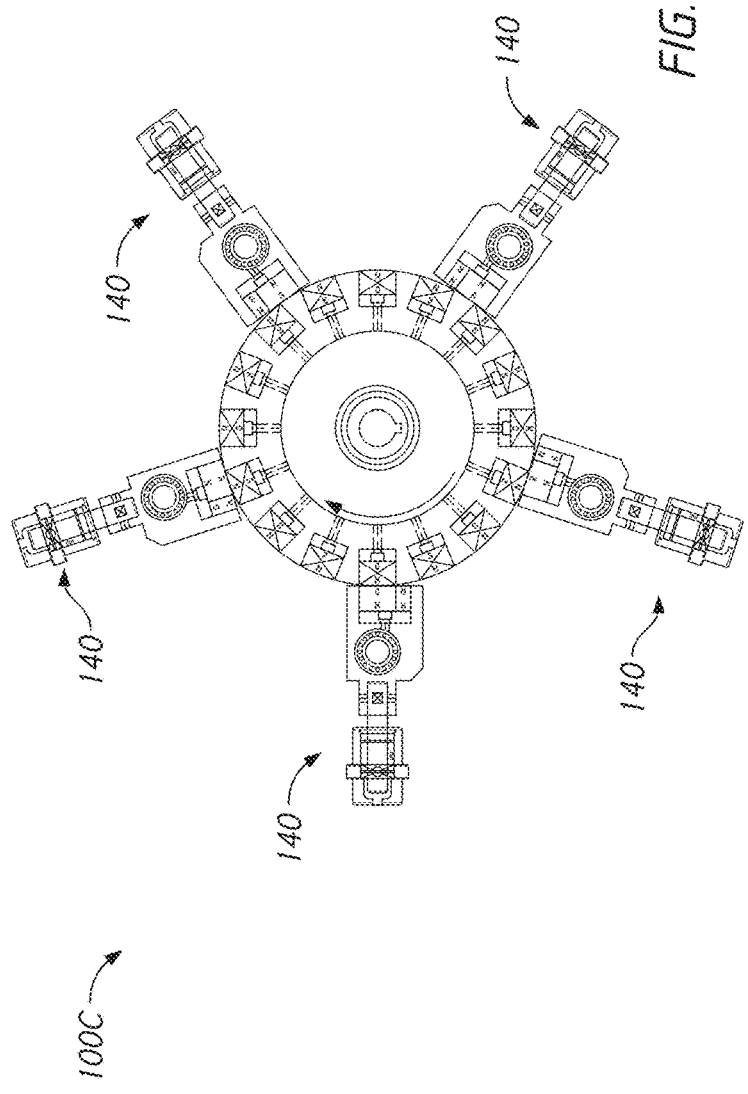
FIG. 16 is a partial front elevational view of a set of magnetic leg members including five pairs of magnetic leg members.

For example, as shown in FIG. 16, instead of the arrangement of three sets of reciprocating mechanisms 140, a portion of the drive 100C can include five reciprocating mechanisms 140. Each one of the mechanisms 140 can include two or four magnetic leg member assemblies 142A, 142B, as described above with reference to FIG. 15. In the illustrated embodiment, as shown in FIG. 18, each of the reciprocating assemblies 140 includes five magnetic leg member assemblies 142, and five magnetic leg embers 142B arranged side by side. Further, the magnetic drive 100C includes eight sets of the reciprocating members illustrated in FIG. 16 for a total of 80 magnetic leg member assemblies and eight flywheel assemblies, each flywheel assembly including two flywheels 110A, 110B, such as that described in FIG. 8.

Figure 17:
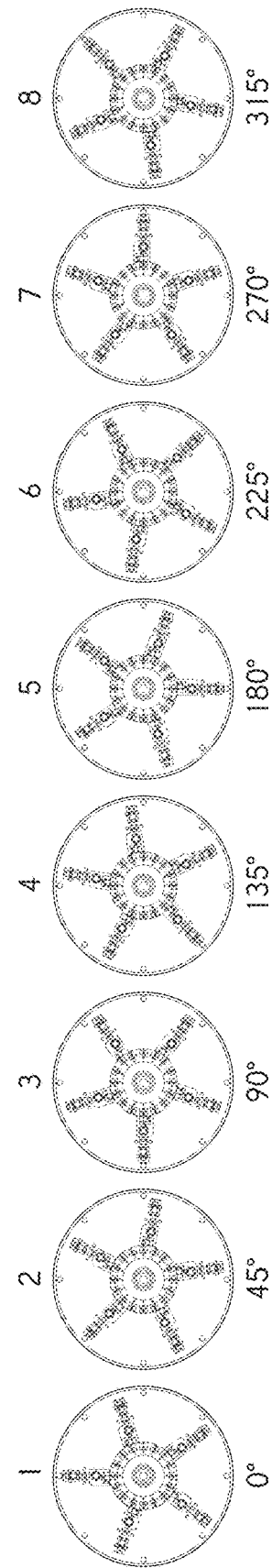
FIG. 17 is a schematic diagram of eight sets of the magnetic leg members of FIG. 16, each being offset from one another by 45 degrees.

As shown in FIG. 17, each of the sets of five reciprocating mechanisms 140 are offset by the other sets by 45 degrees. As shown in FIG. 19, when looking axially down the flywheel axis 114, the reciprocating mechanisms 140 are offset from one another by nine degrees around the flywheel axis 114. Such an arrangement of reciprocating mechanisms 140 around the eight flywheel assemblies can provide a further ability to transmit torque from the reciprocating mechanisms 140 to the flywheel and the flywheel shaft 112. Other configurations can also be used.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A torque amplifying magnetic drive comprising:
   a frame;
   at least first and second magnetic leg members, supported by the frame with a reciprocating connector mechanism configured to guide the first and second magnetic leg members through a reciprocating movement, the first and second magnetic leg members each comprising a first end, wherein the reciprocating connector mechanism guides the first and second magnetic leg members through a reciprocating movement comprising an elliptical path;
   first and second leg magnets disposed at the first end of the first and second magnetic leg members, respectively;
   wherein the first magnetic leg member comprises a pivot, pivotally mounted to a pivot shaft and a telescoping portion configured to move between retracted and extended states, the first leg magnet being disposed closer to the pivot portion when the telescoping portion is in the retracted state and the first leg magnet being disposed further from the pivot when the telescoping portion is in the extended state
   a magnetic flywheel supported by a rotational shaft, the magnetic flywheel comprising an outer surface and at least a first plurality and a second plurality of flywheel magnets disposed at the outer surface, the first and second pluralities of flywheel magnets being aligned and sequentially juxtaposed with the first and second leg magnets, respectively, during rotation of the magnetic flywheel, the first plurality of flywheel magnets having an opposite polarity to a polarity of the first leg magnet, the second plurality of flywheel magnets having an opposite polarity to a polarity of the second leg magnet, wherein the first and second pluralities of flywheel magnets are disposed adjacent to one another, along an axial direction of the flywheel;
   a drive mechanism configured to drive the first and second magnetic legs through the reciprocating movement;
   wherein the reciprocating connector mechanism guides the first magnetic leg member through a first portion of the reciprocating movement and a second portion of the reciprocating movement, the first portion of the reciprocating movement comprises a first position of the first magnetic leg member in which the first leg magnet is spaced from an outer surface of the magnetic flywheel at a first spacing, a movement from the first position to a second position at which the first leg magnet is at a minimum spacing from the outer surface of the magnetic flywheel and a third position in which the first leg magnet is spaced from the first flywheel magnet at a third spacing from the outer surface of the magnetic flywheel, the first and third spacings being larger than the minimum spacing;
   wherein the first and second pluralities of flywheel magnets are sequentially spaced sufficiently close to the first and second leg magnets, respectively, such that the magnetic flywheel is rotated during reciprocation of the first and second magnetic leg members, which thereby transfer torque from the first and second magnetic leg members to the magnetic flywheel by magnetic attraction and repulsion therebetween.

2. The magnetic drive according to claim 1, wherein the telescoping portion comprises a first telescoping portion fixed to the pivot and a second telescoping portion engaged with the drive mechanism so as to move the second telescoping portion through the reciprocating movement.

3. The magnetic drive according to claim 2, wherein the drive mechanism comprises a crankshaft supported by the frame, the crankshaft including a throw, the second telescoping portion engaged with the throw of the crankshaft.

4. The magnetic drive according to claim 1, wherein the elliptical path comprises a major axis extending parallel to a tangent of the outer surface of the magnetic flywheel.

5. The magnetic drive according to claim 1, wherein the elliptical path of the first leg magnet defines a pinch point gap between an outer surface of the first leg magnet and the outer surface of the magnetic flywheel, the elliptical path comprising a major axis extending generally parallel to a tangent of the outer surface of the magnetic flywheel at the pinch point gap.

6. The magnetic drive according to claim 1, wherein the first leg magnet comprises a North Pole and a South Pole, wherein a secondary leg magnet is disposed at the first end of the first magnetic leg, the secondary leg magnet comprises a North Pole and a South Pole, wherein the South Pole of the first leg magnet is disposed at the outer surface of the first end and the North Pole of the first leg magnet is disposed inwardly from the outer surface of the first end, and wherein the North Pole of the secondary magnet is disposed at the outer surface of the first end.

7. The magnetic drive according to claim 6, wherein the first leg magnet is larger than the secondary leg magnet.

8. The magnetic drive according to claim 7, wherein the first leg magnet is disposed in a leading position of the reciprocating movement and the secondary magnet is disposed in a trailing position relative to the reciprocating motion.

9. The magnetic drive according to claim 1, wherein the first and second magnetic leg members move in a walking movement and thereby transfer torque to the flywheel through interaction of the first and second leg magnets and first and second flywheel magnets, respectively.

10. A torque amplifying magnetic drive comprising:
a frame;
at least first and second magnetic leg members, supported by the frame with a reciprocating connector mechanism configured to guide the first and second magnetic leg members through a reciprocating movement, the first and second magnetic leg members comprising a first end;
first and second leg magnets disposed at the first end of the first and second magnetic leg members, respectively;
a magnetic flywheel supported by a rotational shaft, the magnetic flywheel comprising an outer surface and at least first and second flywheel magnets disposed at the outer surface, the first and second flywheel magnets being aligned and juxtaposed with the first and second leg magnets, respectively, during rotation of the magnetic flywheel, the first flywheel magnet having an opposite polarity to a polarity of the first leg magnet, the second flywheel magnet having an opposite polarity to a polarity of the second leg magnet;
a drive mechanism configured to drive the first and second magnetic legs through the reciprocating movement;
wherein the first and second flywheel magnets are spaced sufficiently close to the first and second leg magnets, respectively, so as to rotate the magnetic flywheel during reciprocation of the first and second magnetic leg members, thereby transferring torque from the first and second magnetic leg members to the magnetic flywheel;
wherein the reciprocating connector mechanism guides the first and second magnetic leg members through an elliptical path.

11. The magnetic drive according to claim 10, wherein the magnetic flywheel comprises a first plurality of flywheel magnets aligned circumferentially with the first flywheel magnet and a second plurality of flywheel magnets aligned circumferentially with the second flywheel magnet.

12. The magnetic drive according to claim 10, wherein the first magnetic leg member comprises a pivot, pivotally mounted to a pivot shaft and a telescoping portion configured to move between retracted and extended states, in which the first leg magnet is disposed closer to the pivot portion when the telescoping portion is in the retracted state and the first leg magnet is disposed further from the pivot when the telescoping portion is in the extended state.

13. The magnetic drive according to claim 12, wherein the telescoping portion comprises a first telescoping portion fixed to the pivot and a second telescoping portion engaged with the drive mechanism so as to move the second telescoping portion through the reciprocating movement.

14. The magnetic drive according to claim 10, wherein the first leg magnet comprises a North Pole and a South Pole, wherein a secondary leg magnet is disposed at the first end of the first magnetic leg, the secondary leg magnet comprises a North Pole and a South Pole, wherein the South Pole of the first leg magnet is disposed at the outer surface of the first end and the North Pole of the first leg magnet is disposed inwardly from the outer surface of the first end, wherein the North Pole of the secondary magnet is disposed at the outer surface of the first end.

15. The magnetic drive according to claim 14, wherein the first leg magnet is larger than the secondary leg magnet.

16. The magnetic drive according to claim 10, wherein the reciprocating connector mechanism guides the first magnetic leg member through a first portion of the reciprocating movement and a second portion of the reciprocating movement, the first portion of the reciprocating movement comprises a first position of the first magnetic leg member in which the first leg magnet is spaced from the first flywheel magnetic at a first spacing, a movement from the first position to a second position at which the first leg magnet is at a minimum spacing from the first flywheel magnet and a third position in which the first leg magnet is spaced from the first flywheel magnet at a third spacing, the first and third spacing being larger than the minimum spacing.

17. The magnetic drive according to claim 10, wherein the first and second magnetic leg members move in a walking movement and thereby transfer torque to the magnetic flywheel through interaction of the first and second leg magnets and the first and second flywheel magnets, respectively.

18. The magnetic drive according to claim 16, wherein the first and second portions of the reciprocal movement form an elliptical path.

19. A torque amplifying magnetic drive comprising:
a frame;
at least a first magnetic leg member supported by the frame;
a first leg magnet disposed at an end of the first magnetic leg member;
a magnetic flywheel supported by a rotational shaft, the magnetic flywheel comprising an outer surface and at least a first plurality of flywheel magnets disposed at the outer surface;
a drive mechanism configured to drive the first magnetic leg member through a reciprocating movement adjacent to the outer surface of the magnetic flywheel, the reciprocating movement comprising an elliptical path;
wherein the first plurality of flywheel magnets are sequentially spaced sufficiently, close to the first leg magnet during rotation of the magnetic flywheel such that torque is transferred from the first magnetic leg member to the magnetic flywheel and thereby the magnetic flywheel is rotated during reciprocation of the first magnetic leg member.

* * * * *